United States Patent [19]
Bouet et al.

[11] Patent Number: 5,384,209
[45] Date of Patent: Jan. 24, 1995

[54] HYDRIDABLE MATERIAL FOR THE NEGATIVE ELECTRODE OF A NICKEL-HYDRIDE STORAGE CELL

[75] Inventors: Jacques Bouet, Paris; Bernard Knosp, Neuilly Sur Seine; Annick Percheron-Guegan; Olivier Canet, both of Paris, all of France

[73] Assignee: Saft, Romainville, France

[21] Appl. No.: 139,884

[22] Filed: Oct. 22, 1993

Related U.S. Application Data

[63] Continuation of Ser. No. 944,938, Sep. 15, 1992, abandoned.

[30] Foreign Application Priority Data

Sep. 11, 1992 [FR] France ............................ 92-10858

[51] Int. Cl.⁶ ............................................. H01M 4/38
[52] U.S. Cl. ............................................ 429/59; 429/101; 420/449; 420/451; 420/459; 420/580; 420/588; 420/900
[58] Field of Search ................... 429/59, 101; 420/449, 420/451, 452, 459, 580, 588, 900

[56] References Cited

U.S. PATENT DOCUMENTS

| | | | |
|---|---|---|---|
| 4,228,145 | 10/1980 | Gamo et al. | 420/900 X |
| 4,913,879 | 4/1990 | Honda et al. | 420/900 X |
| 4,983,474 | 1/1991 | Dol et al. | 429/59 |
| 5,096,667 | 3/1992 | Fetcenko | 429/101 X |
| 5,149,383 | 9/1992 | Seri et al. | 420/900 X |

*Primary Examiner*—Stephen Kalafut
*Attorney, Agent, or Firm*—Sughrue, Mion, Zinn, Macpeak & Seas

[57] ABSTRACT

The present invention provides a hydridable material for the negative electrode of a nickel-hydride storage cell mainly comprising a Laves phase of the C14 hexagonal type ($MgZn_2$), characterized by the general formula:

$$(Zr_{1-a}A_a)(Ni_{1-(b+c+d+e)}Mn_b Al_c Co_d M_e)_t$$

where:
$1.9 \leq t \leq 2.1$  $0 < b \leq 0.6$
$0 \leq a \leq 0.3$  $0 < c \leq 0.4$
$b + c + d + e \leq 0.8$  $0 < d \leq 0.4$
 $0 \leq e \leq 0.6$ where A represents at least one element from Ti, Y, Ce, Ca, and Mg, and where M is chosen from Cr, V, and Si.

13 Claims, 3 Drawing Sheets

HYDRIDABLE MATERIAL FOR THE NEGATIVE ELECTRODE OF A NICKEL-HYDRIDE STORAGE CELL

This application is a continuation application of application Ser. No. 07/944,938 filed Sep. 15, 1992 now abandoned.

This invention relates to a hydridable material for the negative electrode of a nickel-hydride storage cell and its preparation process.

In certain fields of use, nickel-cadmium storage cells are being replaced by nickel-hydride storage cells. Sealed nickel-hydride storage cells are alkaline storage cells having an aqueous electrolyte. The reagent constituted by hydrogen is stored in the mass of the hydridable alloy which is capable of absorbing large quantities thereof. Depending on whether the storage cell is being charged or discharged, such an alloy must be capable of taking up hydrogen and of restoring it at a speed that is high enough under normal operating conditions. It must also have a higher electrochemical capacity than cadmium, it must withstand corrosion in potassium hydroxide, and it must not be toxic.

Currently, the main alloys used are hydridable alloys of the $AB_5$ type, derived from $LaNi_5$, because of their good chemical stability. Such materials are already produced industrially, and in practice they have a capacity per unit mass of about 300 mAh/g (and about 350 mAh/g in theory), thereby making it possible to achieve energy per unit mass of 55 Wh/kg, and energy per unit volume of 175 Wh/l in a sealed spiral component. They have now reached a stage of maturity that makes it difficult to increase their electrochemical performance levels any further.

Other classes of hydridable materials do exist, such as alloys of the AB type, e.g. derived from the systems TiV, TiFe, TiCr, TiCo, TiNi, etc. But such alloys are not used because they are less able to withstand corrosion, or because of the way their crystal structures change during cycling.

Much research has also been done into intermetallic compounds of the $AB_2$ type referred to as "Laves phases". Such phases may be classified into three crystal structures: C15 cubic ($MgCu_2$ type), C14 hexagonal ($MgZn_2$), and C36 hexagonal ($MgNi_2$), C36 hexagonal symmetry being rare.

Compounds derived from $TiMn_x$, $HfMn_x$, $ZrMn_x$, where x lies in the range 1.5 to 2 (Z. Metallkd, 79(1), 1988, 24–31) may be mentioned as examples of C14-type Laves phases. But such phases may also be obtained from the systems $ZrCr_2$, $ZrV_2$, etc.

Patent Application EP-A-0,293,660 describes alloys of the $AB_a$ type, where a lies in the range 1 to 2.5, which alloys include at least one phase of the "Laves phase" type whose crystal structure is C14-type hexagonal ($MgZn_2$), or C15-type cubic ($MgCu_2$), with a lattice-size parameter lying the range 6.92 Å to 7.7 Å. But producing such materials industrially suffers from problems arising from their high oxidizability in air, their vulnerability to being corroded by electrolyte, and their passivation when they are used in electrodes.

The ever-increasing needs of the market require an increase in the energy per unit volume of storage cells. For certain uses, e.g. in portable tools, an increase in energy per unit mass is also necessary.

An object of the present invention is to increase both the capacity per unit volume and the capacity per unit mass of nickel-hydride storage cells, by providing a class of hydridable alloys for making negative electrodes, which alloys offer capacities and physical and chemical properties that are improved relative to prior materials.

The present invention provides a hydridable material for the negative electrode of a nickel-hydride storage cell mainly comprising a Laves phase of the C14 hexagonal type ($MgZn_2$), characterized by the general formula:

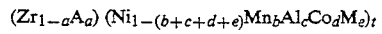

$$(Zr_{1-a}A_a)(Ni_{1-(b+c+d+e)}Mn_bAl_cCo_dM_e)_t$$

where: $1.9 \leq t \leq 2.1$     $0 < b \leq 0.6$
$0 \leq a \leq 0.3$     $0 < c \leq 0.4$
$b + c + d + e \leq 0.8$     $0 < d \leq 0.4$
    $0 \leq e \leq 0.6$ where A represents at least one element from Ti, Y, Ce, Ca, and Mg, and where M is chosen from Cr, V, and Si. Preferably, A is Y or Ce.

It is desirable for the Laves phase to represent at least 80% of the alloy. Zirconium confers to the alloy its electro-chemical and gas solid capacity, and nickel's role is to allow the alloy to resist against corrosion. The chosen substituting elements are preferably an atomic radius close to the one of the host metal in order to restrict the distortion of the structure.

Preferably, in said general formula of said hydridable material, $0.4 \leq b \leq 0.6$. The introduction of manganese increases the initial specific capacity in the unloading (discharge) state.

Preferably, in said general formula of said hydridable material, $0 < c \leq 0.2$. Aluminum does not from a hydride but it makes it possible to stabilize the one that is formed with the other compounds. Furthermore, it lowers the value of the pressure level when its content increases.

Preferably, in said general formula of said hydridable material, $0 < d \leq 0.2$. The alloy's resistance against corrosion through the electrolyte improves when cobalt is present.

In a variant, in said general formula of said hydridable material, $0.4 \leq e \leq 0.6$.

Preferably, in said general formula, $0.5 \leq b+c+d+e \leq 0.8$.

Preferably, in said general formula, when A represents Y, $0.01 \leq a \leq 0.15$; when A represents Ce, $0.01 \leq a \leq 0.15$; when A represents Ca, $0.01 \leq a \leq 0.06$; and when A represents Mg, $0.01 \leq a \leq 0.10$. These substituting elements act to stabilize the hydride. Preferably, in said general formula $c+d+e < 0.3$, and preferably still, in said general formula, $b+c+e < 0.7$.

The metal alloy is obtained by melting the elements together. In order to obtain a homogeneous single-phase alloy having a given crystal structure, it is necessary to perform melting on a plurality of occasions.

Said hydridable material is used to make a negative electrode for a nickel-hydride storage cell from a mixture composed firstly of said hydridable material in powder form, secondly 0.1% to 10% of a conductive powder, such as carbon which may be plated with palladium or with platinum, and thirdly 0.05% to 5% of organic binder, such as PTFE, which mixture is fixed on a conductive support.

Particular advantages of an electrode of the present invention are that it starts discharging without any delay, and that it withstands inversion.

Other characteristics and advantages of the present invention appear on reading the following examples of embodiments given by way of non-limiting example and with reference to the accompanying drawings, in which.

EXAMPLE 1

Prior art alloy $Zr(Ni_{0.4}Cr_{0.6})_2$

An alloy composed of $Zr(Ni_{0.4}Cr_{0.6})_2$ was made in the following manner:

- a mixture was made from constituent metals that were of high purity (99.9% to 99.999%);
- the mixture was homogenized by being melted on a plurality of successive occasions in an induction furnace equipped with a copper crucible cooled by water under argon partial pressure;
- after being melted for the last time, the alloy was annealed under a vacuum for 4 hours at 1,200° C; and
- the resulting alloy was reduced to powder form by mechanical grinding performed in argon.

Analysis by X-ray crystallography showed that the alloy was constituted mainly by a C14 hexagonal Laves phase of the $MgZn_2$ type having parameters a=5.0286 Å and c=8.2327 Å.

An electrode was made which was 90% composed of hydridable alloy in powder form (diameter<36 μm), 5% composed of a conductive carbon powder, and 5% composed of organic binder based on PTFE, and which was supported by a current collector made of expanded nickel.

In order to evaluate the electrode electrochemically, the electrolyte was 8.7N potassium hydroxide KOH, and the positive electrode was a nickel hydroxide electrode used in nickel-cadmium storage cells.

The electrode was tested under the following conditions:

- discharging at a current of 60 mA per gram of hydridable alloy, with discharging being stopped at a voltage of 0.9 V; and
- charging at a current of 30 mA per gram of hydridable alloy for 16 hours.

Figure 1:
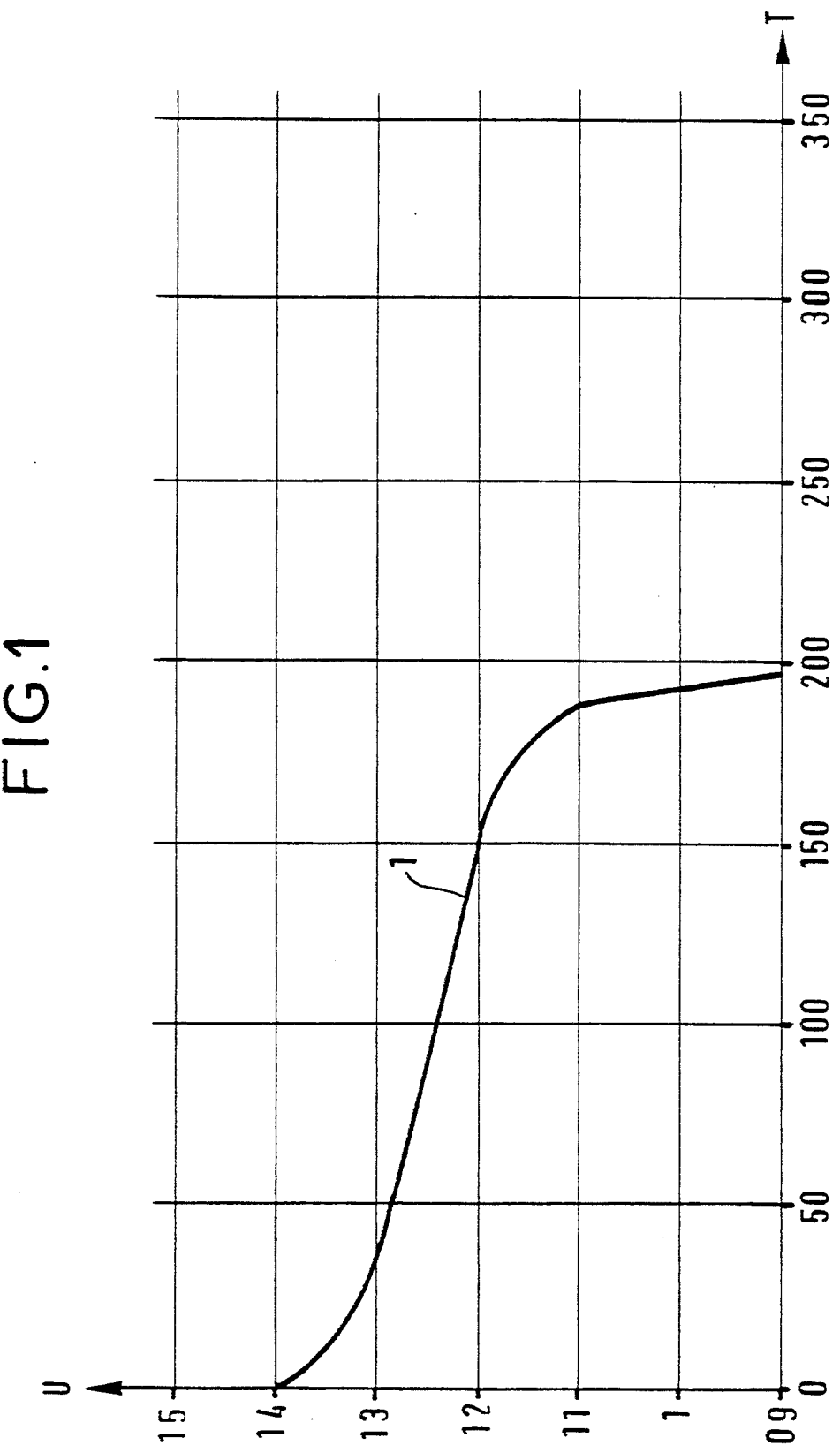
FIG. 1 shows the discharge curve of a prior art electrode containing the alloy: $Zr(Ni_{0.4}Cr_{0.6})_2$.

The discharge curve 1 is given in FIG. 1 in which U is the voltage in volts, and T is the duration of discharge in minutes.

Under those conditions, that electrode restored at the third unloading (discharge) a capacity of 200 mAh per gram of hydridable alloy.

EXAMPLE 2

Alloy $Zr(Ni_{0.4}Mn_{0.4}Al_{0.125}Co_{0.075})_2$

An electrode was made and tested as in example 1, but using the alloy of the invention: $Zr(Ni_{0.4}Mn_{0.4}Al_{0.125}Co_{0.075})_2$.

This compound was also a C14-type Laves phase.

The capacity restored at the third cycle was 290 mAh per gram of hydridable alloy.

EXAMPLE 3

Alloy $Zr_{0.7}Ti_{0.3}(Ni_{0.4}Mn_{0.4}Al_{0.125}Co_{0.075})_2$

An electrode was made and tested as in example 1, but using the alloy of the invention: $Zr_{0.7}Ti_{0.3}(Ni_{0.4}Mn_{0.4}Al_{0.125}Co_{0.075})_2$.

This compound also crystallizes into a structure of C14-type Laves phases whose parameters are a=4.984 Å and c=8.117 Å.

Figure 2:
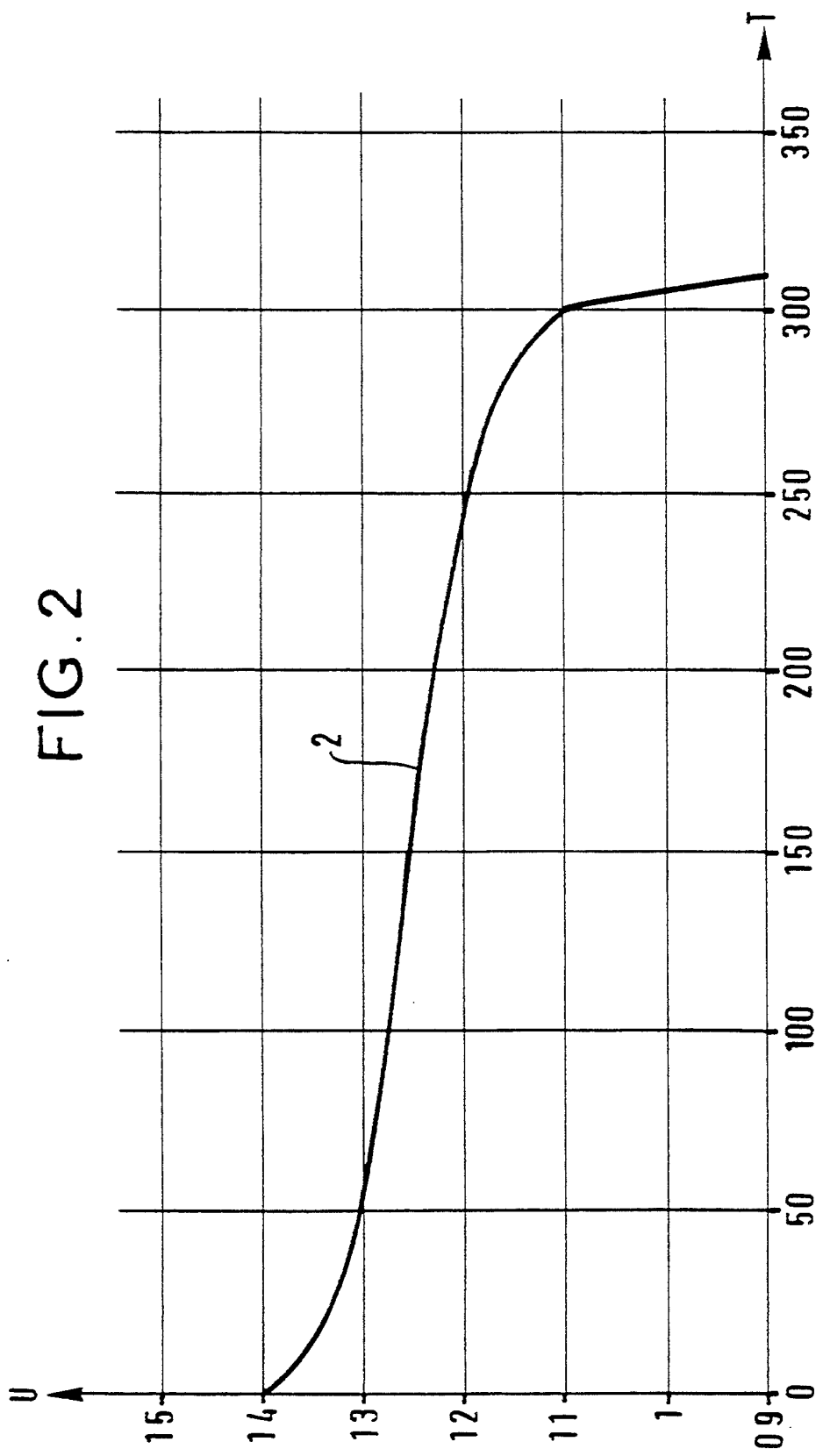
FIG. 2 shows the discharge curve of an electrode containing the alloy of the invention: $Zr_{0.7}Ti_{0.3}(Ni_{0.4}Mn_{0.4}Al_{0.125}Co_{0.075})_2$.

FIG. 2 shows the discharge curve 2 of the electrode containing this alloy (U is the voltage in volts, and T is the duration of the discharge in minutes). The capacity restored at the third cycle is 310 mAh per gram of hydridable alloy.

Figure 3:
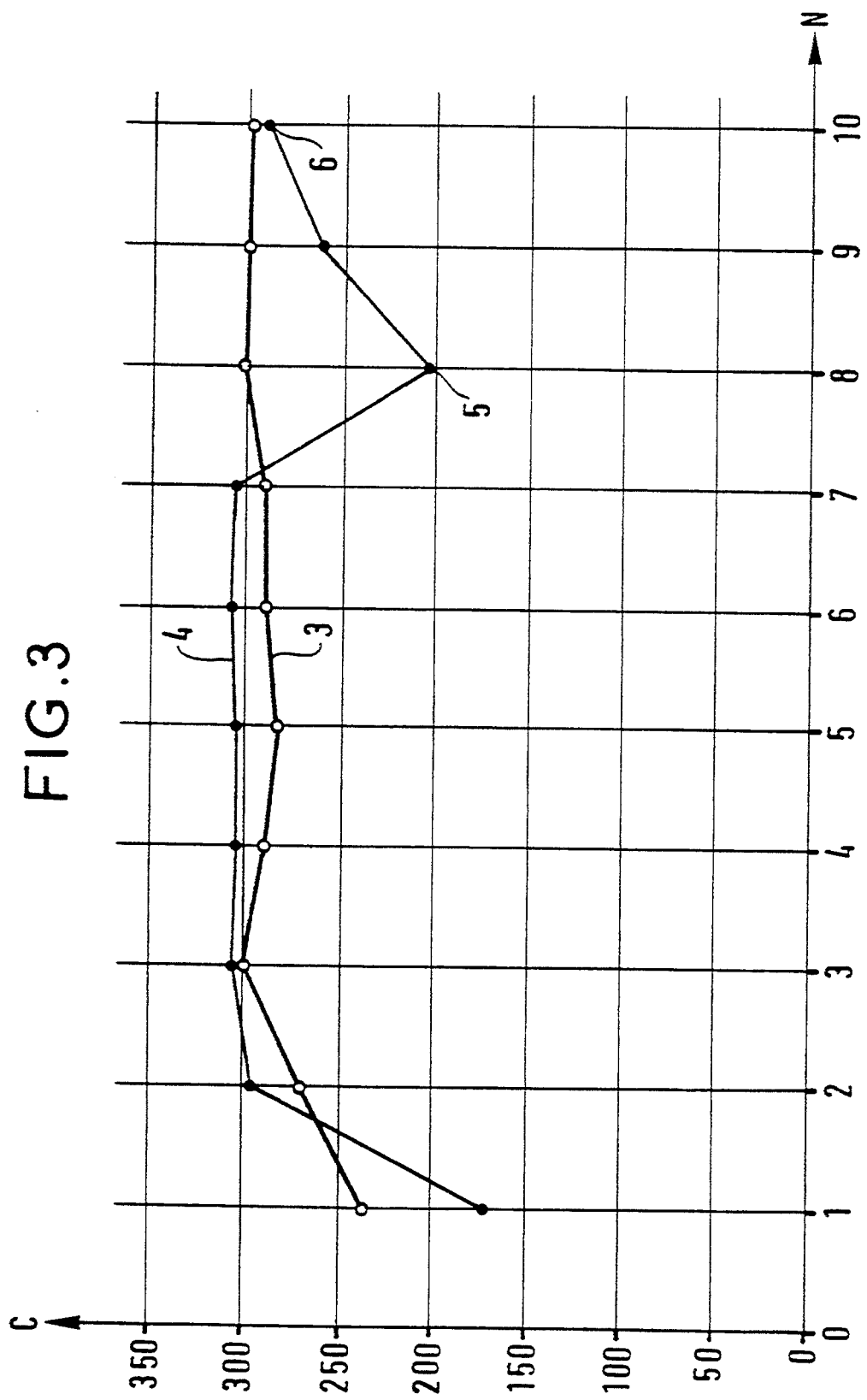
FIG. 3 shows the capacity discharged during cycling from an electrode containing the alloy: $Zr_{0.7}Ti_{0.3}(Ni_{0.4}Mn_{0.4}Al_{0.125}Co_{0.075})_2$.

FIG. 3 shows the capacities of two electrodes of the invention containing the hydridable alloy: $Zr_{0.7}Ti_{0.3}(Ni_{0.4}Mn_{0.4}Al_{0.125}Co_{0.075})_2$, the capacities being referenced 3 and 4, discharged at a current of 60 mA per gram of hydridable alloy, and measured during cycling. In FIG. 3, C represents capacity in mAh per gram of hydridable alloy, and N is the cycle number. For the electrode in curve 4, the test was performed under conditions identical to the conditions described in example 1. For the electrode in curve 3, the main discharge (at 60 mA per gram of alloy) was followed by a residual discharge at 30 mA per gram of hydridable alloy (i.e. C/10) down to 0.9 V. This caused slight degradation of the electrode, which degradation explains the fact that the performance levels are slightly lower than those of the other electrode.

It can be seen that, on the 8th cycle, the electrode in curve 4 suffered a drop in capacity 5 due to it being inverted for 25 minutes. By the 10th cycle, the electrode had recovered its capacity 6.

EXAMPLE 4

Alloy $Zr(Ni_{0.4}Mn_{0.35}Al_{0.125}Co_{0.075}Cr_{0.05})_2$.

An electrode was made and tested as in example 1, but using the alloy of the invention: $Zr(Ni_{0.4}Mn_{0.35}Al_{0.125}Co_{0.075}Cr_{0.05})_2$.

The capacity restored at the third cycle was 300 mAh per gram of hydridable alloy.

EXAMPLE 5

Alloy $Zr_{0.95}Y_{0.05}(Ni_{0.4}Mn_{0.4}Al_{0.125}Co_{0.075})_2$

An electrode was made and tested as in example 1, but using the alloy of the invention: $Zr_{0.95}Y_{0.05}(Ni_{0.4}Mn_{0.4}Al_{0.125}Co_{0.075})_2$;

The capacity restored at the third cycle was 380 mAh per gram of hydridable alloy.

Naturally, the present invention is not limited to the above-described embodiments. It may have numerous variants while still remaining within the spirit of the invention.

What is claimed is:

1. A hydridable material for the negative electrode of a nickel-hydride storage cell mainly comprising a Laves phase of the C14 hexagonal type ($MgZn_2$), characterized by the general formula:

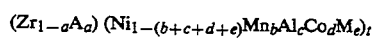

-continued where: $1.9 \leq t \leq 2.1$ $\quad 0 < b \leq 0.6$
$\quad 0 \leq a \leq 0.3$ $\quad 0 < c \leq 0.4$
$\quad b + c + d + e \leq 0.8$ $\quad 0 < d \leq 0.4$
$\quad 0 \leq e \leq 0.6$ where A represents at least one element from Ti, Y, Ce, Ca, and Mg, and where M is chosen from Cr and Si.

2. A hydridable material according to claim 1, characterized in that, in said general formula, $0.4 \leq b \leq 0.6$.

3. A hydridable material according to claim 1, characterized in that, in said general formula, $0 < c \leq 0.2$.

4. A hydridable material according to claim 1, characterized in that, in said general formula, $0 < d \leq 0.2$.

5. A hydridable material according to claim 1, characterized in that, in said general formula, $0.4 \leq e \leq 0.6$.

6. A hydridable material according to any preceding claim 1, characterized in that, in said general formula, $0.5 \leq b+c+d+e \leq 0.8$.

7. A hydridable material according to claim 1, characterized in that, in said general formula, when A represents Y, $0.01 \leq a \leq 0.15$.

8. A hydridable material according to any preceding claim 1, characterized in that, in said general formula, when A represents Ce, $0.01 \leq a \leq 0.15$.

9. A hydridable material according to claim 1, characterized in that, in said general formula, when A represents Ca, $0.01 \leq a \leq 0.06$.

10. A hydridable material according to any preceding claim 1, characterized in that, in said general formula, when A represents Mg, $0.01 \leq a \leq 0.10$.

11. A negative electrode for a nickel-hydride storage cell, said electrode containing a hydridable material according to claim 1, and said electrode being characterized in that it is made from a mixture composed firstly of said hydridable material in powder form, secondly 0.1% to 10% of a conductive powder, and thirdly 0.05% to 5% of organic binder, which mixture is fixed on a conductive support.

12. A hydridable material according to claim 7, characterized in that in said general formula, $c+d+e<0.3$.

13. A hydridable material according to claim 7, characterized in that in said general formula, $b+c+e<0.7$.

* * * * *